United States Patent
Tal et al.

(10) Patent No.: US 11,461,288 B2
(45) Date of Patent: Oct. 4, 2022

(54) SYSTEMS AND METHODS FOR DATABASE MANAGEMENT SYSTEM (DBMS) DISCOVERY

(71) Applicant: ServiceNow, Inc., Santa Clara, CA (US)

(72) Inventors: Hail Tal, Tel Aviv (IL); Shay Herzog, Tel Aviv (IL); Shiri Hameiri, Tel Aviv (IL); Tom Bar Oz, Tel Aviv (IL)

(73) Assignee: ServiceNow, Inc., Santa Clara, CA (US)

( * ) Notice: Subject to any disclaimer, the term of this patent is extended or adjusted under 35 U.S.C. 154(b) by 672 days.

(21) Appl. No.: 16/353,860

(22) Filed: Mar. 14, 2019

(65) Prior Publication Data

US 2020/0293502 A1    Sep. 17, 2020

(51) Int. Cl.
*G06F 16/21* (2019.01)
*G06F 16/27* (2019.01)
*G06F 16/25* (2019.01)
*G06F 16/22* (2019.01)

(52) U.S. Cl.
CPC .......... *G06F 16/21* (2019.01); *G06F 16/2228* (2019.01); *G06F 16/254* (2019.01); *G06F 16/27* (2019.01)

(58) Field of Classification Search
CPC ..... G06F 16/21; G06F 16/2228; G06F 16/254
See application file for complete search history.

(56) References Cited

U.S. PATENT DOCUMENTS

| | | |
|---|---|---|
| 5,978,594 A | 11/1999 | Bonnell et al. |
| 6,321,229 B1 | 11/2001 | Goldman |
| 6,609,122 B1 | 8/2003 | Ensor |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |

(Continued)

OTHER PUBLICATIONS

U.S. Appl. No. 15/944,523, filed Apr. 3, 2018, Garry et al.
(Continued)

*Primary Examiner* — Mohsen Almani
(74) *Attorney, Agent, or Firm* — Fletcher Yoder PC

(57) ABSTRACT

The present disclosure is directed to a discovery process that enables discovery of database management systems (DBMSs) hosted by at least one client device of a client network. The disclosed discovery process involves a discovery server disposed on the client network accessing the client device hosting the DBMS to collect configuration item (CI) data on the configuration and operation of management, extraction, and replication processes of the DBMS. More specifically, this discovery process involves the discovery server requesting and receiving certain CI data from the management process of the DBMS, requesting and receiving certain CI data from an operating system (OS) of the client devices, as well as parsing and retrieving certain CI data from configuration and report files of the DBMS. Additionally, the disclosed discovery process is designed to be performed without being granted special or additional privileges within the DBMS itself.

20 Claims, 12 Drawing Sheets

(56) References Cited

U.S. PATENT DOCUMENTS

| | | |
|---|---|---|
| 7,131,037 B1 | 10/2006 | LeFaive |
| 7,170,864 B2 | 1/2007 | Matharu |
| 7,350,209 B2 | 3/2008 | Shum |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,877,783 B1 | 1/2011 | Cline |
| 7,890,802 B2 | 2/2011 | Gerber |
| 7,925,981 B2 | 4/2011 | Pourheidari |
| 7,930,396 B2 | 4/2011 | Trinon |
| 7,933,927 B2 | 4/2011 | Dee |
| 7,941,506 B2 | 5/2011 | Bonal |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,200,620 B2* | 6/2012 | Akiyama ................. G06F 8/34 705/300 |
| 8,224,683 B2 | 7/2012 | Manos |
| 8,266,096 B2 | 9/2012 | Navarrete |
| 8,346,752 B2 | 1/2013 | Sirota |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,646,093 B2 | 2/2014 | Myers |
| 8,674,992 B2 | 3/2014 | Poston |
| 8,683,032 B2 | 3/2014 | Spinelli |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,812,752 B1* | 8/2014 | Shih ................. G06Q 10/063 710/29 |
| 8,818,994 B2 | 8/2014 | Kowalski |
| 8,832,652 B2 | 9/2014 | Mueller |
| 8,849,947 B1* | 9/2014 | Artzi ................. G06F 9/45558 718/1 |
| 8,887,133 B2 | 11/2014 | Behnia |
| 8,907,988 B2 | 12/2014 | Poston |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,261,372 B2 | 2/2016 | Cline |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,534,903 B2 | 1/2017 | Cline |
| 9,535,737 B2 | 1/2017 | Joy |
| 9,613,070 B2 | 4/2017 | Kumar |
| 9,631,934 B2 | 4/2017 | Cline |
| 9,659,051 B2 | 4/2017 | Hutchins |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 9,819,729 B2 | 11/2017 | Moon |
| 9,852,165 B2 | 12/2017 | Morozov |
| 9,967,162 B2 | 5/2018 | Spinelli |
| 10,002,203 B2 | 6/2018 | George |
| 2011/0251992 A1* | 10/2011 | Bethlehem ............ H04L 67/306 707/610 |
| 2014/0025788 A1* | 1/2014 | Mahadevan ............ H04L 43/08 709/220 |
| 2014/0040976 A1* | 2/2014 | Furuichi ................. G06F 21/60 726/1 |
| 2014/0156816 A1* | 6/2014 | Lopez Da Silva . H04L 41/0813 709/221 |
| 2014/0279992 A1* | 9/2014 | Morozov .............. G06F 16/951 707/706 |
| 2017/0337236 A1* | 11/2017 | Jurowicz ............. G06F 16/2365 |
| 2017/0373932 A1* | 12/2017 | Subramanian ...... H04L 41/0853 |
| 2018/0146049 A1* | 5/2018 | Africa ................. H04L 41/0886 |
| 2018/0329981 A1* | 11/2018 | Gupte ....................... G06F 8/60 |

OTHER PUBLICATIONS

U.S. Appl. No. 16/059,813, filed Aug. 9, 2018, Tal et al.
U.S. Appl. No. 16/163,187, filed Oct. 17, 2018, Biran et al.
U.S. Appl. No. 16/163,204, filed Oct. 17, 2018, Bitterfeld et al.
U.S. Appl. No. 16/163,240, filed Oct. 17, 2018, Badyan et al.
U.S. Appl. No. 16/228,267, filed Dec. 20, 2018, Bar Oz et al.
U.S. Appl. No. 16/228,312, filed Dec. 20, 2018, Bar Oz et al.
U.S. Appl. No. 16/247,272, filed Jan. 14, 2019, Garry et al.
U.S. Appl. No. 16/251,701, filed Jan. 18, 2019, Feiguine et al.
U.S. Appl. No. 16/250,666, filed Jan. 17, 2019, Tal et al.
U.S. Appl. No. 16/189,875, filed Nov. 13, 2018, Goudarzi et al.
U.S. Appl. No. 16/261,177, filed Jan. 29, 2019, Bar Oz et al.

* cited by examiner

| Field | Value |
|---|---|
| NAME (382) | MGR@009SLD1 |
| VERSION (384) | 12.2.0.1.160823 |
| SOURCE DB (386) | 009SLD1 |
| REPLICATS COUNT (388) | 1 |
| EXTRACTS COUNT (390) | 2 |
| CONFIGURATION FILE (392) | /dsld09/sid/gguser/12c11/dirprm/mgr.prm |
| REPORT FILE (394) | /dsld09/sid/gguser/12c11/dirrpt/MGR.rpt |
| DESCRIPTION (400) | |
| TYPE (396) | ORACLEGOLDENGATE MANAGER FOR ORACLE |
| INSTALLATION DIRECTORY (398) | /dsld09/sid gguser/12c11 |

SYSTEMS AND METHODS FOR DATABASE MANAGEMENT SYSTEM (DBMS) DISCOVERY

BACKGROUND

The present disclosure relates generally to database management systems (DBMSs) and, more specifically, to discovery of DBMSs disposed on a client network.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In certain situations, a client instance hosted by the cloud computing service may store configuration item (CI) data in a configuration management database (CMDB) of the client instance. This CI data can include hardware and software information regarding computing systems operating on a client network. In certain situations, one or more computing systems on the client network host a DBMS, which is an application that manages data on the client network. For example, certain DBMSs may enable data capture, extraction, replication, transformation, verification, and so forth, even in heterogeneous informational technology (IT) environments. As such, it is presently recognized that it may be desirable for the CMDB to include CI data for DBMSs operating on a client network.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed to enabling discovery of database management systems (DBMSs) hosted by one or more client devices of a client network. The disclosed discovery process involves a discovery server, such as a management, instrumentation, and discovery (MID) server, disposed on the client network accessing the client devices hosting the DBMS to collect configuration item (CI) data on the configuration and operation of various processes (e.g., management, extraction, and/or replication processes) of the DBMS. More specifically, this discovery process involves the discovery server requesting and receiving certain CI data from the management process of the DBMS, requesting and receiving certain CI data from an operating system (OS) of the client devices, as well as parsing and retrieving certain CI data from configuration and report files of the DBMS. In certain cases, the disclosed discovery process may include transforming certain received or retrieved CI data to address discovery issues (e.g., duplication, null fields). Additionally, the disclosed discovery process is designed to be performed without being granted special or additional privileges within the DBMS itself.

At the conclusion of the discovery process, the collected CI data is transmitted from the discovery server to the client instance, where it is stored in a number of CI tables of a configuration management database (CMDB). This stored DBMS CI data can subsequently be accessed (e.g., viewed, modified) by a user interface (UI) associated with the client instance. For example, a portion of the UI associated with the client instance may use the CI data stored in the CMDB to graphically present relationships between the processes of the DBMS on the client network, to enable incidents and change requests to be opened for CIs of the DBMS, and/or to evaluate license compliance with respect to the operation of the DBMS on the client network.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 10 is a simulated screen-shot of a portion of the UI that is designed to present CI data from the CI_DBMS table of the CMDB for the management process of the DBMS, in accordance with aspects of the present disclosure;

DETAILED DESCRIPTION

Figure 1:
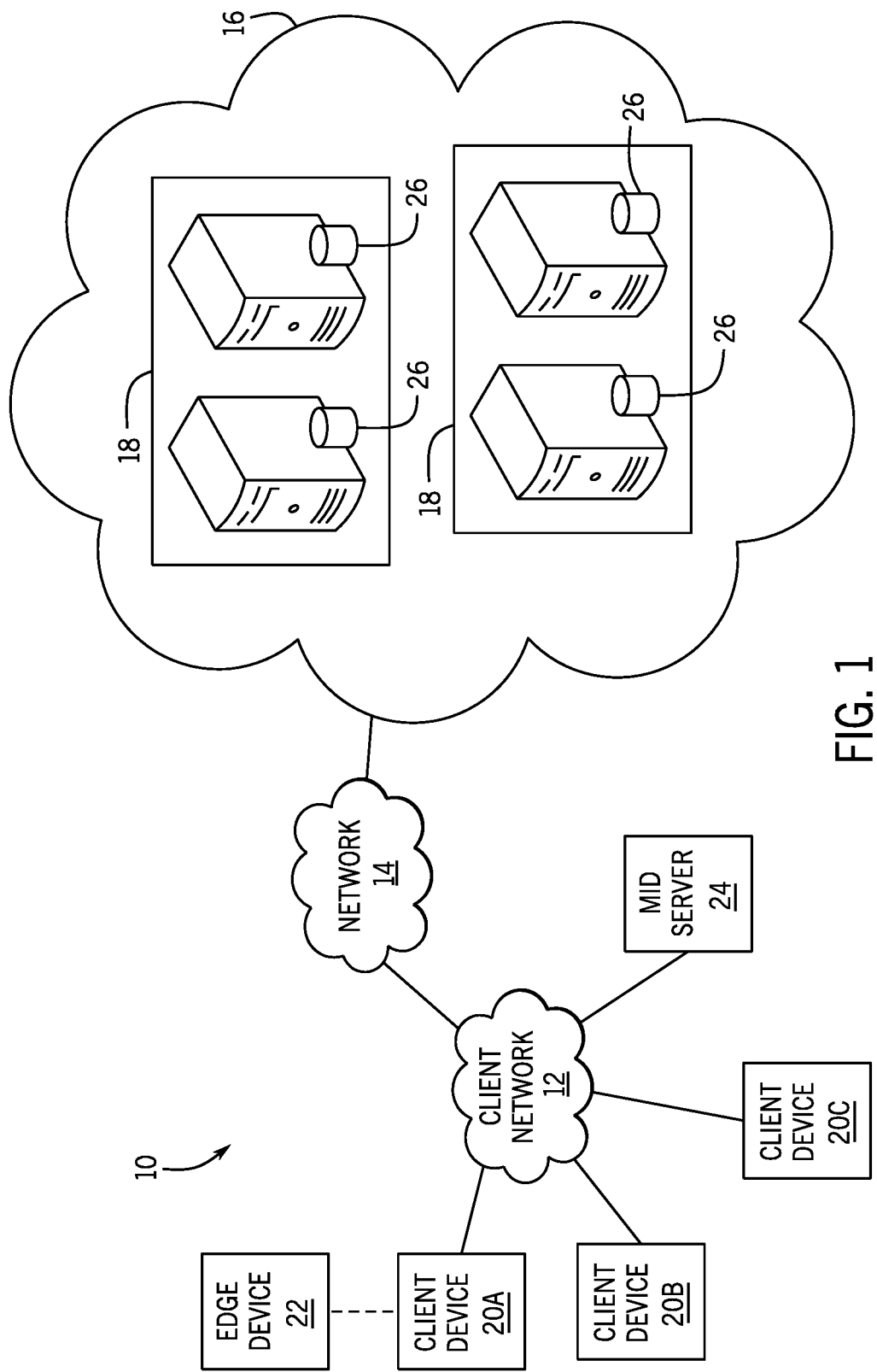
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "configuration item" or "CI" refers to a record for any component (e.g., computer, device, piece of software, database table, script, webpage, piece of metadata, and so forth) in an enterprise network, for which relevant data, such as manufacturer, vendor, location, or similar data, is stored in a configuration management database (CMDB).

As mentioned, in certain situations, one or more client devices on the client network host a DBMS. The DBMS is an application that manages data on the client network, enabling, for example, data capture, extraction, replication, transformation, verification, and so forth, on the client network. As such, in order to import CI data regarding a DBMS operating on the client network, it is presently recognized that it is desirable to have a discovery process that enables detection of the various processes of the DBMS, such that CI data associated with the DBMS can be discovered and transmitted to the client instance for storage within the CMDB. Additionally, it is presently recognized that it is desirable for the discovery process to be executable without receiving additional or special privileges relative to other discovery processes executed on the client network.

With the foregoing in mind, present embodiments are directed to enabling discovery of DBMSs hosted by one or more client devices of a client network. The disclosed discovery process involves a discovery server (e.g., a management, instrumentation, and discovery (MID) server) disposed on the client network accessing one or more client devices hosting the DBMS to collect configuration item (CI) data on the configuration and operation of various processes (e.g., management, extraction, and/or replication processes) of the DBMS. More specifically, as discussed below, the discovery server may request and receive certain CI data from the management process of the DBMS, request and receive certain CI data from an operating system (OS) of the client devices, and parse and retrieve certain CI data from configuration and report files of the DBMS. In certain cases, the disclosed discovery process may include transforming certain received or retrieved CI data to address discovery issues (e.g., duplication, null fields). Additionally, the disclosed discovery process is designed to be performed without being granted special or additional privileges within the DBMS itself. At the conclusion of the discovery process, the collected CI data is transmitted from the discovery server to the client instance, where it is stored in a number of CI tables of a configuration management database (CMDB). This stored CI data can subsequently be accessed (e.g., viewed, modified) by a user interface (UI) associated with the client instance. For example, a portion of the UI associated with the client instance may use the CI data stored in the CMDB to graphically present relationships between the processes of the DBMS on the client network, to enable incidents and change requests to be opened for CIs of the DBMS, and/or to evaluate license compliance with respect to the operation of the DBMS on the client network.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20 so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
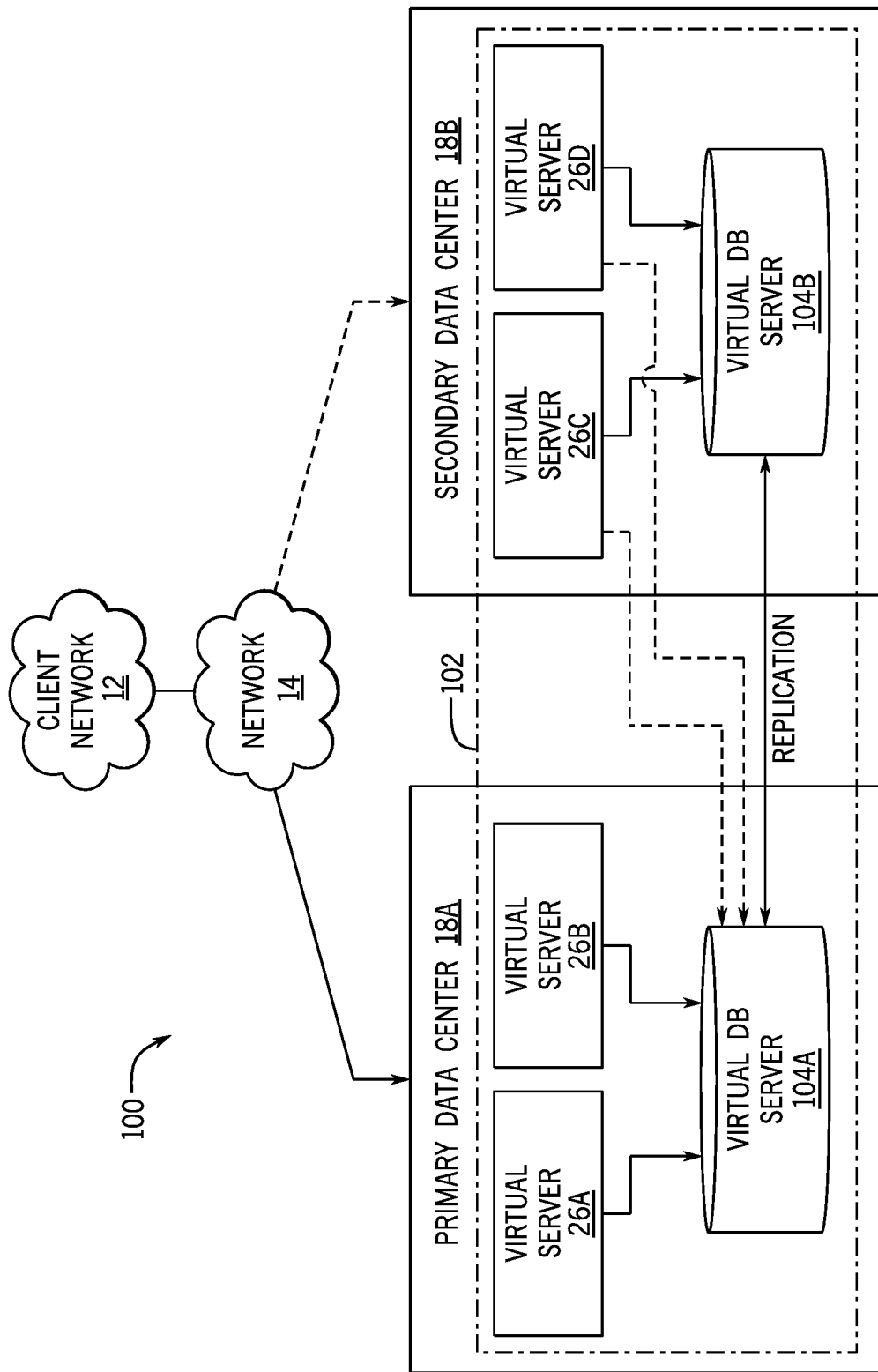
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
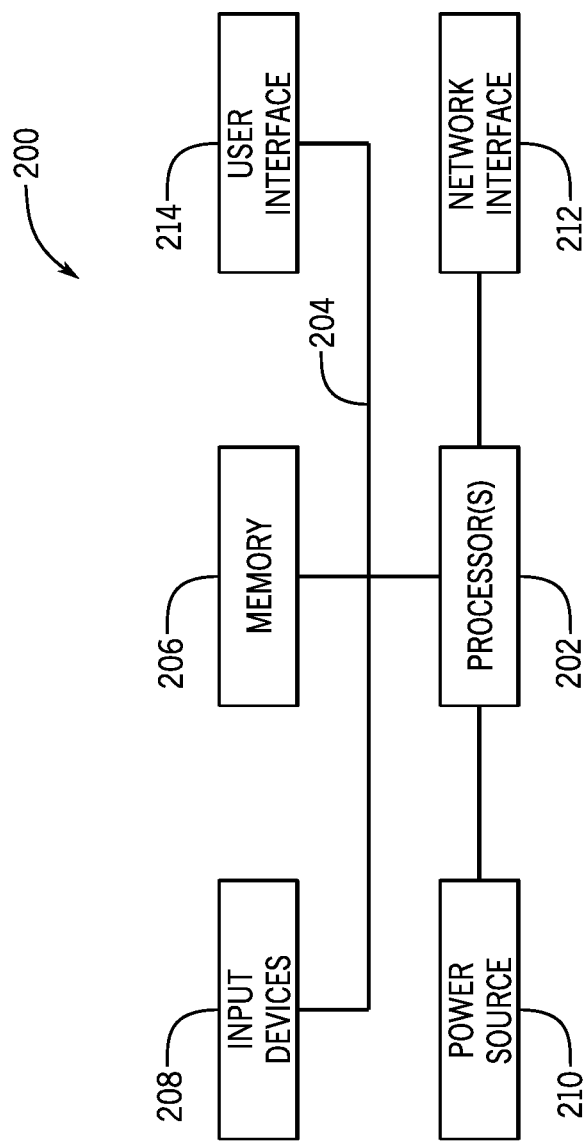
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
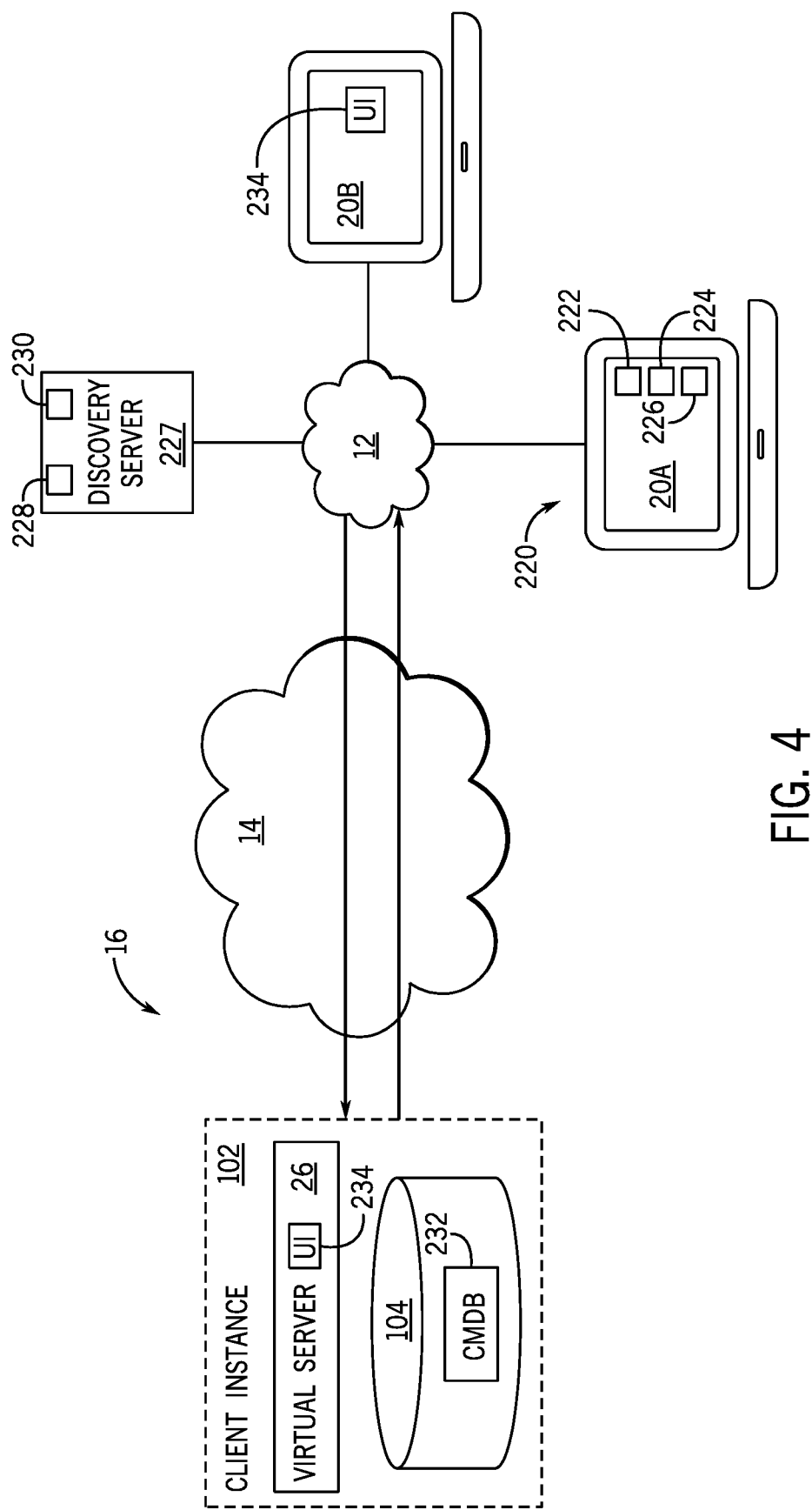
FIG. 4 is a block diagram illustrating an embodiment in which a discovery server discovers a database management system (DBMS) of a client network and provides the collected configuration item (CI) data to a client instance for storage in a configuration management database (CMDB), in accordance with aspects of the present disclosure.

With the foregoing in mind, FIG. 4 is a block diagram illustrating an embodiment in which a virtual server 26 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser of the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of client devices, such as client device 20A-20D, concurrently, wherein each client device is in communication with the single client instance 102. Also, cloud provider infrastructures may be configured to support any number of client instances, such as client instance 102, concurrently, with each of the instances in communication with one or more client devices. As mentioned above, an end-user may also interface with client instance 102 using an application that is executed within a web browser.

For the embodiment illustrated in FIG. 4, the client network 12 hosts a DBMS 220. In certain embodiments, the DBMS 220 may be ORACLE GOLDEN GATE available from Oracle (e.g., https://www.oracle.com/middleware/technologies/goldengate.html). More specifically, within the example client network 12, client device 20A hosts a management process 222 of the DBMS 220, one or more extraction processes 224 of the DBMS 220, and one or more replication processes 226 of the DBMS 220. In other embodiments, the management process 222, extraction processes 224, and replication processes 226 may be hosted on different client devices 20, and the DBMS 220 may include any suitable number of extraction and/or replication processes. Within the illustrated DBMS 220, the management process 222 controls and manages the overall operation of the DBMS 220. As such, the extraction processes 224 and the replication processes 226 report to, and are controlled by, the management process 222. The extraction processes 224 enable data extraction or capture from a number of different data sources (e.g., log files, spreadsheets, databases) on the client network 12. The replication processes 226 enable data replication by ensuring that database operations performed on a first data source are also suitably propagated to a second data source.

The illustrated embodiment includes a discovery server 227, which may be the MID server 24 illustrated in FIG. 1, or another suitable computing device disposed on the client network 12. The illustrated discovery server 227 includes a memory 228 storing instructions and a processor 230 that executes these instructions to perform a discovery process. As used herein, "discovery" refers to probing client devices 20 of the client network 12 to determine information about the hardware, software, and operation of each client device 20. For example, in certain embodiments, the discovery server 227 may execute a horizontal or landscape discovery process that collects hardware, software, and/or operation data for all client devices 20 associated with the client network 12. In other situations, the discovery server 227 may execute a vertical or "quick" discovery process that collects hardware, software, and/or operation data for a particular target CI (e.g., client device 20A) of the client network 12. In certain embodiments, the horizontal discovery process may collect certain information for all client devices 20 of the client network, and may lack certain details (e.g., criticality of particular error messages). In contrast, the vertical discovery process may collect all discoverable information, including criticality, for a limited subset of the client devices 20, based on the parameters of the vertical discovery process.

In certain embodiments, during the discovery process, the discovery server 227 may poll each of the client devices for CI data. In other embodiments, each of the client devices 20 may execute a respective discovery agent that collects CI data from each of the client devices 20 and reports the CI data to the discovery server 227. The CI data collected by the discovery server 227 is transmitted to the client instance 102, and is subsequently stored within a CMDB 232 of the client instance 102. Once within the CMDB 232, the CI data, including DBMS CI data, is available to the components of the client instance 102. For example, the client device 20B may be an end-user device hosting a user interface (UI) 234, such as a collection of fillable forms, which draws CI data from the CMDB for presentation on the client device 20B. In certain embodiments, the UI 234 may be hosted by a virtual server 26 of the client instance 102, and may be accessed and presented within a web browser executing on the client device 20B.

For the embodiment illustrated in FIG. 4, the CMDB 232 is designed to store CI data regarding the DBMS 220 operating on the client network 12. As such, the disclosed discovery process executed by the discovery server 227 includes collecting CI data regarding the management process 222, the extraction processes 224, and the replication processes 226, all hosted by the client device 20A in this example. The DBMS CI data collected is transmitted to the client instance 102 and stored in a number of CI tables of the CMDB 232, as discussed below. Additionally, as mentioned, the disclosed discovery process is designed to collect the desired information regarding the DBMS 220 without being granted additional or special privileges within the DBMS 220 application.

Figure 5:
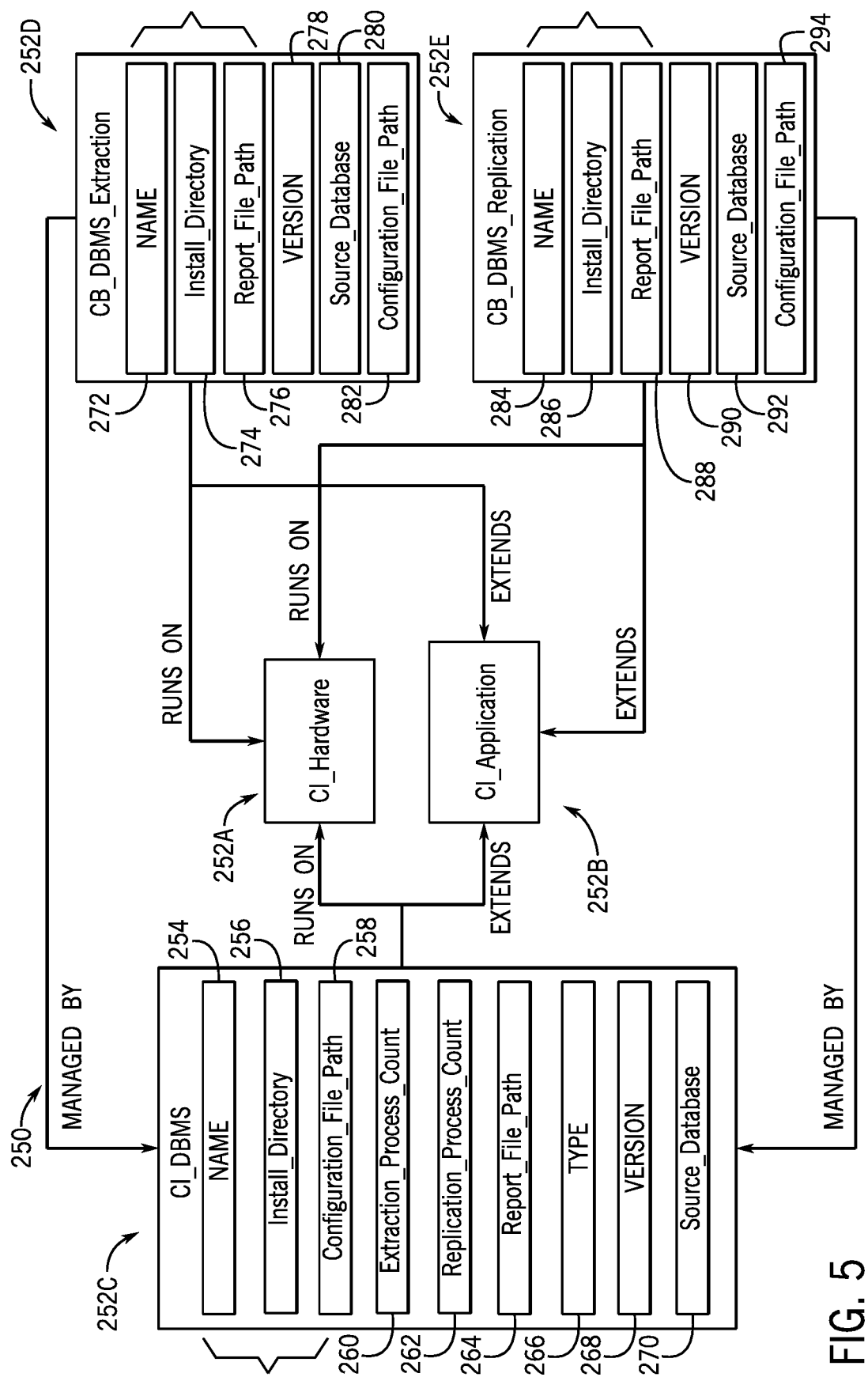
FIG. 5 is an embodiment of a class/data model designed to store DBMS CI data, including: a CI_DBMS table that stores CI data for a management process of the DBMS, a CI_DBMS_Extraction table that stores CI data regarding one or more extraction processes of the DBMS, and a CI_DBMS_Replication table that stores CI data regarding one or more replication processes of the DBMS, in accordance with aspects of the present disclosure.

FIG. 5 is a class/data model 250 that defines a data structure to DBMS CI data for the DBMS 220 operating on the client network 12, in accordance with an embodiment of the present approach. For the illustrated embodiment, the model 250 is implemented in an at least partially object-oriented database, and as such, the model 250 represents both class structure and data structure. As such, it should be appreciated that the CI tables 252 illustrated in FIG. 5 may be alternatively referred to herein as classes, and the fields of the CI tables 252 may be alternatively referred to as attributes. Additionally, it may be appreciated that the class/data model 250 represents a locally-managed data structure in the memory 228 of the discovery server 227 that stores the CI data collected during the discovery process, and which is subsequently transmitted to client instance 102 for storage in the CMDB 232. As such, the class/data model 250 of the illustrated embodiment describes the locally-managed data structure populated by the discovery server 227, as well as the data structure within the CMDB 232 in which the discovered CI data is eventually stored.

As illustrated, the model 250 includes a CI_Hardware table 252A storing hardware information and a CI Application table 252B storing application information for the client devices 20 of the client network 12. Additionally, the model 250 illustrated in FIG. 5 also includes a CI_DBMS table 252C that is designed to store a record for each management process 222 discovered by the discovery server 227 on the client network 12. For the illustrated embodiment, the CI_DBMS table 252C includes a Name field 254 that stores the CI name of the DBMS 220, an Install_Directory field 256 that stores information regarding a directory or path of the client device 20A storing files (e.g., setup files, configuration files, library files, executable files, report files, and so forth) of the DBMS 220, and a Configuration_File_Path field 258 that stores a string indicating a file path of a configuration file of the management process 222 of the DBMS 220. It may be appreciated that, for the illustrated embodiment, the Name field 254, the Install_Directory field 256, and the Configuration_File_Path field 258 are used in combination to define a unique identifier for each entry in the CI DBMS table 252C.

For the example illustrated in FIG. 5, the CI_DBMS table 252C also stores additional attributes for each management process 222 discovered by the discovery server 227 on the client network 12. These include an Extraction_Process_Count field 260 that stores an integer value indicating the number of extraction processes 224 that are being managed by the management process 222, and a Replication_Process_Count field 262 that stores an integer value indicating the number of replication processes 226 managed by the management process 222. The illustrated CI_DBMS table 252C includes a Report_File_Path field 264 that stores a string indicating a file path of the report file of the management process 222. The illustrated CI_DBMS table 252C also includes a Type field 266 that stores a string describing the type of the DBMS 220, such as the name of the particular DBMS application. Additionally, the illustrated CI_DBMS table 252C includes a Version field 268 that stores a string that describes the version of the DBMS application, as well as a Source_Database field 270 that stores a string identifier for a source database of the management process 222.

The embodiment of the model 250 illustrated in FIG. 5 also includes a CI_DBMS_Extraction table 252D that stores a respective record for each of the extraction processes 224 of the DBMS 220 discovered by the discovery server 227 on the client network 12. For the illustrated embodiment, the CI_DBMS_Extraction table 252D includes a Name field 272 that stores the CI name of each of the extraction processes 224 of the DBMS 220, an Install_Directory field 274 that stores information regarding a directory or path of the client device 20A that stores files (e.g., setup files, configuration files, library files, executable files, report files, and so forth) of the DBMS 220, and a Report_File_Path field 276 that stores a string indicating a path of a report file of each of the extraction processes 224 of the DBMS 220. It may be appreciated that, for the illustrated embodiment, the Name field 272, the Install_Directory field 274, and the Report_File_Path field 276 are used in combination to define a unique identifier for each entry in the CI_DBMS_Extraction table 252D. The illustrated CI_DBMS_Extraction table 252D includes a Version field 278 that stores a string that describes the version of the DBMS application, as well as a Source_Database field 280 that stores a string identifier for the source database of the management process 222. Additionally, illustrated CI_DBMS_Extraction table 252D includes a Configuration_File_Path field 282 that stores a string indicating a file path of the configuration file of each of the extraction processes 224 of the DBMS 220.

The embodiment of the model 250 illustrated in FIG. 5 also includes a CI_DBMS_Replication table 252E that stores a respective record for each of the replication processes 226 of the DBMS 220 discovered by the discovery server 227 on the client network 12. For the illustrated embodiment, the CI_DBMS_Replication table 252E includes a Name field 284 that stores the CI names of each of the replication processes 226 of the DBMS 220, an Install_Directory field 286 that stores information regarding a directory or path of the client device 20A that stores files (e.g., setup files, configuration files, library files, executable files, report files, and so forth) of the DBMS 220, and a Report_File_Path field 288 that stores a string indicating a file path to a report file of each of the replication processes 226 of the DBMS 220. It may be appreciated that, for the illustrated embodiment, the Name field 284, the Install_Directory field 286, and the Report_File_Path field 288 are used in combination to define a unique identifier for each entry in the CI_DBMS_Replication table 252E. The illustrated CI_DBMS_Replication table 252E includes a Version field 290 that stores a string that describes the version of the DBMS application, as well as a Source_Database field 292 that stores a string identifier for the source database of the management process 222. Additionally, illustrated CI DBMS Replication table 252E includes a Configuration_File_Path field 294 that stores a string indicating a file path of a configuration file of each of the replication processes 226 of the DBMS 220.

For the embodiment illustrated in FIG. 5, the class or data model 250 also describes relationships between the tables/classes. As illustrated, the CI_DBMS table 252C, the CI_DBMS_Extraction table 252D, and the CI_DBMS_Replication table 252E are each subject to a containment rule with respect to the CI_Hardware table 252A. As such, each management process 222 stored in the CI_DBMS table 252A is related to (e.g., runs on, is hosted by) a piece of hardware stored as an entry in the CI_Hardware table 252A. Similarly, each of the extraction processes 224 stored as in the CI_DBMS_Extraction table 252D is related to (e.g., runs on, is hosted by) a piece of hardware stored in the CI_Hardware table 252A, and each of the replication processes 226 stored as in the CI_DBMS Replication table 252E is related to (e.g., runs on, is hosted by) a piece of hardware stored in the CI_Hardware table 252A. As illustrated, the CI_DBMS table 252C, the CI_DBMS_Extraction table 252D, and the CI_DBMS_Replication table 252E are also associated with the CI_Application table 252B. As such, each management process 222 stored in the CI_DBMS table 252C is related to (e.g., extends) the CI_Application table 252B, and therefore, the CI_DBMS class 252C inherits attributes and methods defined by the parent CI_Application class 252B. Similarly, the CI_DBMS_Extraction table 252D and the CI_DBMS_Replication table 252E are related to (e.g., extend) the CI_Application table 252B and, therefore, also inherit the attributes and methods defined by the parent CI Application class 252B.

In addition, for the embodiment illustrated in FIG. 5, the CI_DBMS table 252C, the CI_DBMS_Extraction table 252D, and the CI_DBMS_Replication table 252E are related. More specifically, both the CI_DBMS_Extraction table 252D and the CI_DBMS_Replication table 252E are subject to a relations rule indicating that they are managed by the CI DBMS table 252C. In other words, for the illustrated embodiment, the relations rule dictates that the CI_DBMS class 252C manages the CI_DBMS_Extraction class 252D and the CI_DBMS Replication class 252E. As a results of this relationship, when certain fields (e.g., Version field 268, the Source_Database field 270, Install_Directory field 256) of the CI_DBMS table 252C are updated, this information is automatically propagated to the corresponding fields of related records in the CI_DBMS_Extraction table 252D, and the CI_DBMS_Replication table 252E.

Figure 6:
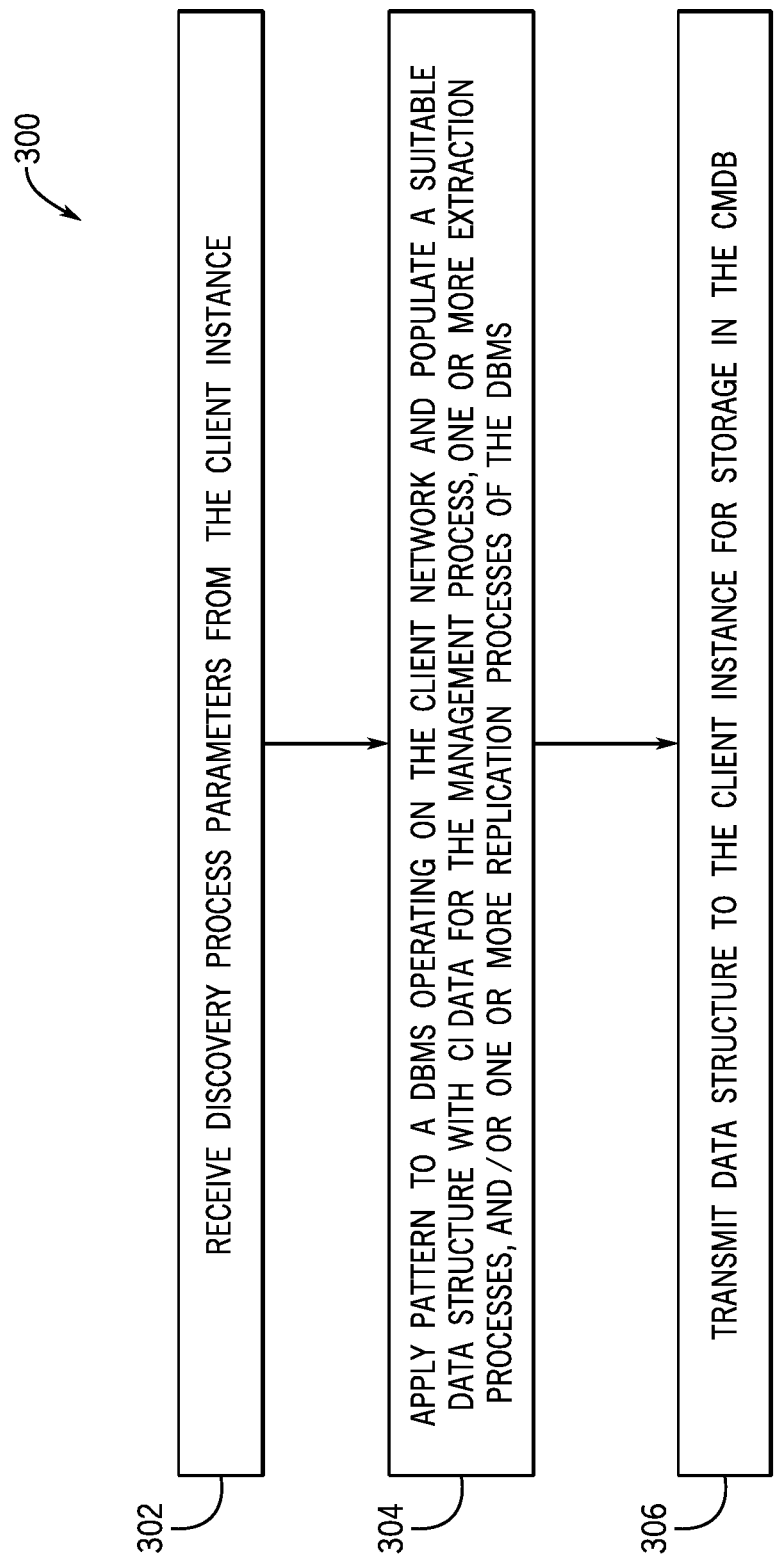
FIG. 6 is a flow diagram illustrating an embodiment of a discovery process by which the discovery server discovers DBMS CI data and provides the discovered DBMS CI data to the client instance, in accordance with aspects of the present disclosure.

FIG. 6 is a flow diagram illustrating an embodiment of a discovery process 300 for discovering CI data for a DBMS 220 of a client network 12. As noted, the discovery process 300 may be stored in the memory 228 and executed by the processor 230 of the discovery server 227 on the client network 12. It may be noted that the illustrated process 300 is merely an example, and in other embodiments, the process 300 may include additional steps, repeated steps, omitted steps, and so forth, in accordance with the present disclosure.

The example process 300 illustrated in FIG. 6 begins with the processor 230 of the discovery server 227 receiving (block 302) discovery process parameters from the client instance 102. For example, in certain embodiments, the discovery server 227 may periodically contact the client instance 102 to receive parameters stored in a suitable table of the database 104 of the client instance 102 that define how the discovery process is to be performed by the discovery server 227. By way of specific example, these parameters may include a uniform resource locator (URL) or internet protocol (IP) address of a target client device against which a DBMS pattern is applied to discover CI data for the DBMS, and a discovery type (e.g., horizontal, vertical) of the discovery process 300. In other embodiments, the client instance 102 may contact the discovery server 227 and provide the parameters for the discovery process to the discovery server 227 periodically or in response to a change in the parameters of the discovery process. For example, in an embodiment, to determine the discovery type of the discovery process 300 (e.g., horizontal or vertical), the processor 230 of the discovery server 227 may execute the following Javascript:

ctx.getWork( ).getDiscoveryType( );

For this JavaScript example, as well as for the other examples provided, the CTX object contains all information received as part of the pattern from the client instance 102, including the class/data model 250 illustrated in FIG. 5. Additionally, for this JavaScript example, as well as for the other examples provided, the example code may be executed using the JavaScript eval( ) function in order to dynamically collect, evaluate, and/or modify the collected CI data.

The example process 300 illustrated in FIG. 6 continues with the processor 230 of the discovery server 227 applying (block 304) a pattern to discover a DBMS 220 operating on the client network 12 and populate a suitable data structure with CI data for the management process 222, the one or more extraction processes 224, and/or the one or more replication processes 226 of the DBMS 220, based on the parameters received in block 302. An example of applying a discovery pattern is discussed below with respect to FIG. 7. In certain embodiments, the data structure corresponds to the data structure of illustrated by the model 250 of FIG. 5. In certain embodiments, the processor 230 of the discovery server 227 may apply the pattern to a single target client device (e.g., vertical discovery) or apply the pattern to all client devices 20 of the client network 12 (e.g., horizontal discovery), depending on the parameters received in block 302. Once the data structure has been populated and discovery is complete, the processor 230 of the discovery server 227 transmits (block 306) the populated data structure in a suitable format (e.g., JavaScript Object Notation (JSON)) via a suitable connection (e.g., SSH connection) to the client instance 102 for storage in the CMDB 232.

Figure 7:
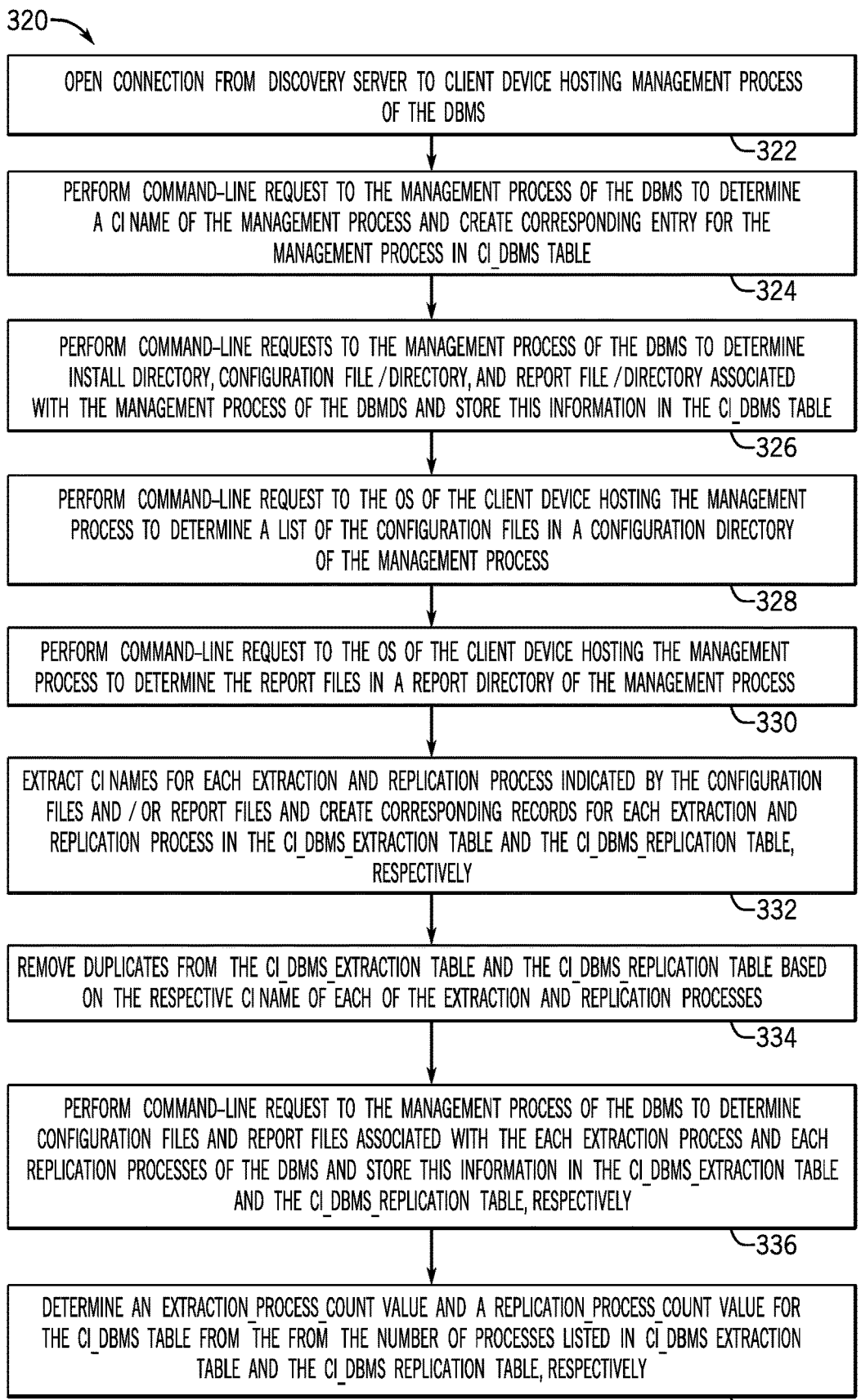
FIG. 7 is a flow diagram illustrating an embodiment of a process by which the discovery server applies an example discovery pattern during the discovery process of FIG. 6, in accordance with aspects of the present disclosure.

FIG. 7 is a flow diagram illustrating an embodiment of a process 320 whereby the discovery server 227 applies the pattern in block 304 of FIG. 6 to discover the DBMS 220. The illustrated process 320 may be stored in the memory 228 and executed by the processor 230 of the discovery server 227 on the client network 12. It may be noted that the illustrated process 320 is merely an example, and in other embodiments, the process 320 may include additional steps, repeated steps, omitted steps, and so forth, in accordance with the present disclosure. Additionally, the process 320 of FIG. 7 is discussed with reference to various elements presented in FIGS. 5 and 6.

For the embodiment illustrated in FIG. 7, the process 320 begins with the processor 230 of the discovery server 227 opening (block 322) a connection from the discovery server 227 to the client device 20A hosting the management process 222 of the DBMS 220. For example, the discovery server 227 may use credentials (e.g., username, password, certificates, cryptography keys) received as part of the discovery process parameters in block 302 of FIG. 6. By way of specific example, in an embodiment, in block 322 of FIG. 7, to open a SSH connection to the discovery server 227 to the client devices 20 hosting portions of the DBMS, the discovery server 227 may execute the following Javascript:

return $ {ctx}.getDiscoveryProvider(com.snc.sw.dto.ProviderType.SSH) .getPrivilegedCommand( );

For the embodiment illustrated in FIG. 7, the process 320 continues with the processor 230 of the discovery server 227 performing (block 324) a command-line request to the management process 222 of the DBMS 220 to determine a CI name of the management process 222 and create corresponding entry for the management process 222 in the locally-managed CI DBMS table 252C. More specifically, the determined CI name of the management process 222 is used to populate the Name field 254 of the CI_DBMS table 252C. Additionally, in certain embodiments, the CI name of the management process 222 may be a combination or concatenation of multiple pieces of collected DBMS information, such as the name of the management process 222+"@"+the Source_Database field 270 value (e.g., "MGR@O09SLD1"), wherein the value of the Source Database field 270 is determined as set forth below.

For the illustrated embodiment, the process 320 continues with the discovery server 227 performing (block 326) command-line requests to the DBMS 220 to determine a string value for the Installation_Directory field 256, a string value for the Configuration_File_Path field 258, and a string value for the Report_File_Path field 264, wherein this information is used to populate corresponding fields for the entry created in the locally-managed CI_DBMS table 252C in block 324. Additionally, the discovery server 227 may also modify (e.g., truncate) the determined string value for the Configuration_File_Path field 258 to determine a configuration file directory, $prm_base_dir, of the management process 222, and modify the determined string value for the Report_File_Path field 264 to determine a report file directory, $rpt base dir, of the management process 222. Additionally, in an embodiment, to determine the value for the Install_Directory field 256 in a manner that handles a null value being returned from the command-line call, the discovery server 227 may execute the following Javascript:

inst_dir=$ {install_directory};
if(inst_dir.isEmpty( ) {return $ {version} };
if(inst_dir.startsWith('/')){return inst dir.replaceAll('/.*/','")};
if(!inst dir.startsWith('/') && !inst_dir.isEmpty( ){return inst_dir.replaceAll('.*\\\\','")};

The discovery server 227 may then use the configuration and report directory information determined in block 326 to glean further DBMS CI data. As such, for the embodiment of the process 320 of FIG. 7, the processor 230 of the discovery server 227 performs (block 328) a command-line request to the OS of the client device 20A hosting the management process 222 to determine a sorted list of the configuration files in the configuration file directory, $prm base dir. For example, when the management process 222 of the DBMS 220 is hosted by a UNIX-based or LINUX-based client device, to determine a sorted list of all configuration files, the discovery server 227 may execute the following command:

"ls–d"+$prm_base_dir+"*.prm|sort"

Additionally, the processor 230 of the discovery server 227 performs (block 330) a command-line request to the OS of the client device 20A hosting the management process 222 to determine a list of the report files in the report file directory, $rpt_base_dir. For example, when the management process 222 of the DBMS 220 is hosted by a UNIX-based or LINUX-based client device, to determine a sorted list of all report files, the discovery server 227 may execute the following command:

"ls–d"+$rpt_base_dir+"*.rpt sort"

It may be appreciated that the process 320 should be executed with sufficient rights to read the configuration files and report files of the DBMS 220. It may also be appreciated that, for other platforms, such as WINDOWS-based systems, equivalent command-line calls to the OS can be used, in accordance with the present disclosure.

For the embodiment illustrated in FIG. 7, the process 320 continues with the processor 230 of the discovery server 227 extracting (block 332) CI names for each of the extraction processes 224 and for each of the replication processes 226 indicated by the configuration files and/or report files. For example, the discovery server 227 may parse each of the configuration files and/or report files identified in blocks 328 and 330 to identify parameters that define the CI names of each of the extraction processes 224 and each of the replication processes 226 of the DBMS 220. Additionally, in block #, the discovery server 227 creates corresponding records for each of the extraction processes 224 and each of the replication processes 226 in the locally-managed CI_DBMS_Extraction table # and the CI_DBMS_Replication table #, respectively, and populates these entries with the CI data gleaned from the configuration and/or report files. For example, in certain embodiments, the discovery server 227 may process these configuration and/or report files to determine the values of other fields in the locally-managed data structure, such as the Type field 266, the Version fields 268, 278, and 290, and the Source_Database fields 270, 280, and 292. More specifically, the CI names for each of the extraction processes 224 are used to populate the Name field 272 for the new records created in the CI_DBMS_Extraction table 252D, and the CI names for each of the replication processes 226 are used to populate the Name field 284 for the new records created in the CI_DBMS_Replication table 252E.

However, it is presently recognized that there may be multiple entries in the configuration or report files for each of the extraction processes 224 and/or replication processes 226 of the DBMS 220. With this in mind, for the embodiment illustrated in FIG. 7, the process 320 continues with the processor 230 of the discovery server 227 removing (block 334) duplicates from the locally-managed CI_DBMS_Extraction table 252D and the CI_DBMS_Replication table 252E based on the respective CI name of each of the extraction processes 224 and replication processes 226. For example, in an embodiment, to remove duplicates from the CI_DBMS_Extraction table 252D based on the CI name of each of the extraction processes 224, the discovery server 227 may execute the following Javascript:

var tableWithoutDuplicates='';
    tableWithoutDuplicates=DuplicateRemover.remove-
      Duplicates($ {CI_DBMS_Extraction},["Name"]);
    CTX. setAttribute("CI_DBMS_Extraction", tableWithoutDuplicates);

Similarly, in an embodiment, to remove duplicates from the CI_DBMS_Replication table 252E based on the CI name of each of the replication processes 226, the discovery server 227 may execute the following Javascript:

var tableWithoutDuplicates='';
    tableWithoutDuplicates=DuplicateRemover.remove-
      Duplicates($ {CI_DBMS_Replication}, ["name"]);
    CTX.setAttribute("CI_DBMS_Replication", tableWithoutDuplicates);

For the embodiment illustrated in FIG. 7, the process 320 continues with the processor 230 of the discovery server 227 performing (block 336) command-line requests to the management process 222 of the DBMS 220 to determine configuration and report directories associated with the each of the extraction processes 224 and each of the replication processes 226 of the DBMS 220. More specifically, in block 336, the discovery server 227 uses the determined directory information to populate a value for the Configuration_File_Path field 282 and the Report_File_Path field 276 for each entry in the locally-managed CI_DBMS_Extraction table 252D, and to populate a value for the Configuration_File_Path field 294 and the Report_File_Path field 288 for each entry in the locally-managed CI_DBMS_Replication table 252E. In certain embodiments, the actions of block 336 may instead be performed along with the actions of block 326.

For the embodiment illustrated in FIG. 7, at some point after the duplicate removal of block 334, the process 320 continues with the processor 230 of the discovery server 227 determining (block 338) a number of extraction processes 224 and a number of replication processes 226 of the DBMS 220. Additionally, in block 338, the discovery server 227 populates the Extraction_Process_Count field 260 of the entry in the locally-managed CI_DBMS table 252C based on the number of related records in the CI_DBMS_Extraction table 252D for the DBMS 220, and populates the Replication_Process_Count field 262 based on the number of related records in the CI_DBMS_Replication table 252E for the DBMS 220. For example, in an embodiment, to determine the number of extraction processes 224, the discovery server 227 may execute the following Javascript:

return $ {CI_DBMS_Extraction[*].Configuration_File_Path}.size( );

Similarly, in an embodiment, once the duplicates have been removed, to determine a number of the replication processes 226, the discovery server 227 may execute the following Javascript:

return $ {CI_DBMS_Replication[*].Configuration_File_Path}.size( )

FIGS. 8-13 are simulated screen-shots of portions of the UI 234, as discussed above with respect to FIG. 4, which are used to define the parameters of the discovery process, as well as to access the DBMS CI data collected and stored in the CMDB 232 by the discovery process of FIG. 6. As such, whether the UI 234 is locally hosted by the client device 20B or hosted by the virtual server 26 and accessed via a web browser of the client device 20B, the disclosed UI 234 enables a user to define aspects of the discovery process and to view/edit the DBMS CI data that is transmitted to the CMDB 232 of the client instance 102 by the discovery server 227. It may be appreciated that these simulated screen-shots are merely examples, and in other embodiments, the UI 234 may include additional elements (e.g., selection buttons, select boxes, combo boxes, radio buttons, and so forth) or fewer elements, in accordance with the present disclosure. Additionally, it may be appreciated that, for certain examples discussed below, the discovery server 227 is more specifically the MID server 24 illustrated in FIG. 1.

Figure 8:
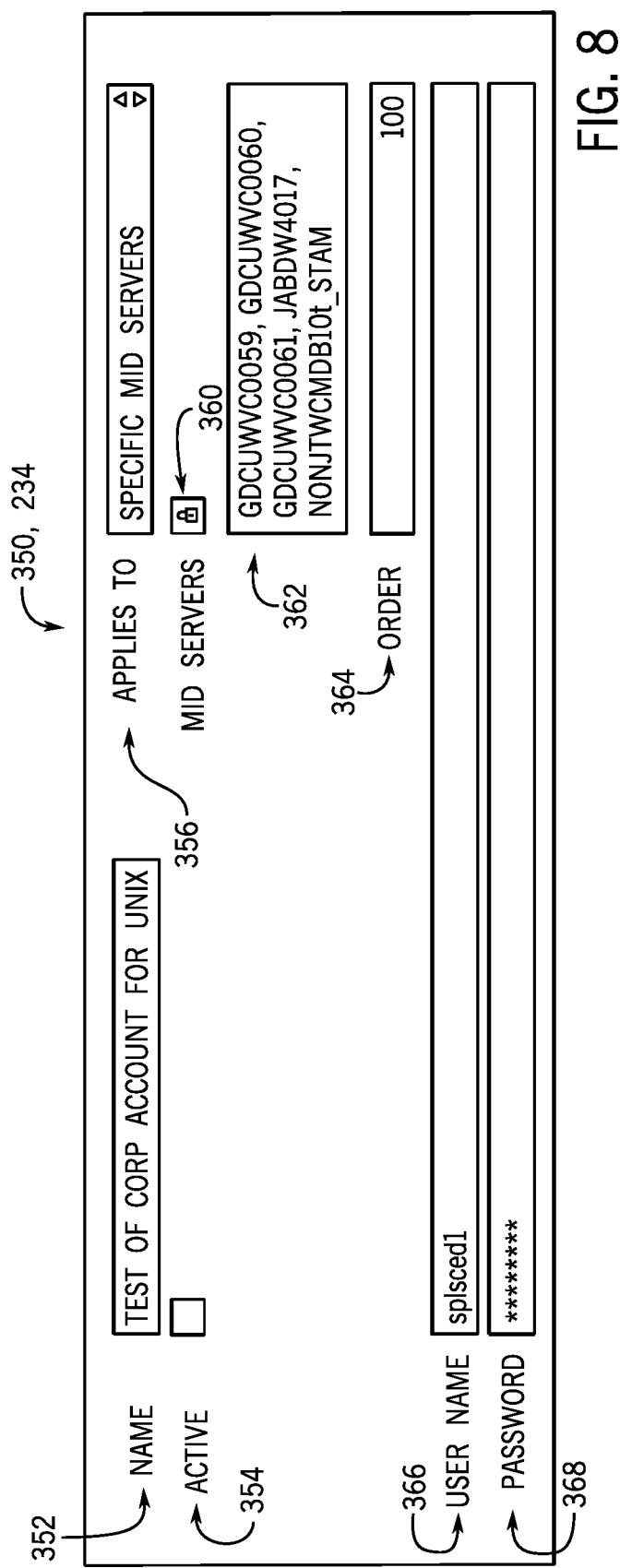
FIG. 8 is a simulated screen-shot of a portion of a user interface (UI) that is designed to receive inputs from a user to define parameters of a horizontal discovery process, in accordance with aspects of the present disclosure.

With the foregoing in mind, FIG. 8 is a simulated screen-shot 350 of a portion of the UI 234 that is designed to receive inputs from a user to define parameters of a horizontal discovery process, in accordance with embodiments of the present approach. The portion of the UI 234 illustrated in FIG. 8 includes a Name field 352 that is designed to receive and present a string that defines the name of the discovery process. The illustrated UI 234 includes an Active checkbox 354 that is designed to receive and present a Boolean value indicating whether or not the discovery process is an active to be executed by the discovery server 227 as part of a discovery job or routine. The illustrated UI 234 also includes an Applies to drop-down list 356 that is designed to receive and present an option from a predefined set of options (e.g., specific MID servers, all MID servers) indicating which discovery servers 227 will execute the discover process. Since the Applies to drop-down list 356 has the option "Specific MID servers" selected, the illustrated UI 234 also includes aMID Servers button 360 that opens a separate window of the UI 234 that enables the user to select any suitable number of discovery servers 227 that will execute the discovery process. Additionally, the illustrated UI 234 includes aMID Servers list 362 which presents a delineated list of discovery server names that have been selected based on inputs received from the user.

The embodiment of the UI 234 illustrated in FIG. 8 also includes an Order field 364 that is designed to receive and present an positive integer value indicating where in the sequence of the discovery job the discovery process will be executed. Additionally, the illustrated UI 234 includes a User name field 366 designed to receive and present a string, as well as a Password field 368 designed to receive and present a masked string, which are credentials (e.g., SSH credentials) that the discovery server 227 uses to access the client devices 20 hosting the DBMS 220 on the client network 12. In other embodiments, the UI 234 may receive other suitable credentials to enable the discovery server 227 to access the client devices 20.

Figure 9:
FIG. 9 is a simulated screen-shot of a portion of the UI that is designed to receive inputs from a user to define parameters of a vertical or "quick" discovery process, in accordance with aspects of the present disclosure.

As mentioned, in certain embodiments, the discovery process 300 may be a vertical discovery process that is directed to discover a particular one of the client devices 20. For example, FIG. 9 is a simulated screen-shot 370 of a portion of the UI 234 that is designed to receive inputs from a user to define parameters of a vertical or "quick" discovery process, in accordance with embodiments of the present approach. The illustrated portion of the UI 234 includes a Target IP field 372 that is designed to receive and present a string representing an IP address of one of the client devices 20 against which the discovery pattern is to be applied. Additionally, the portion of the UI 234 illustrated in FIG. 9 includes aMID server field 374 that is designed to receive and present a string representing the CI name of the discovery server 227 of the client network 12 that will apply the discovery pattern to the client device indicated by the Target IP field 372. Additionally, the illustrated portion of the UI 234 includes MID Server Search button 376 that opens a separate window of the UI 234 that enables the user to select a suitable discovery server 227 to execute the vertical discovery process against the client device indicated by the Target IP field 372.

FIG. 10 is a simulated screen-shot 380 of a portion of the UI 234 that is designed to present CI data from the CI_DBMS table 252C of the CMDB 232 for the management process 222 of the DBMS 220, in accordance with embodiments of the present technique. The illustrated portion of the UI 234 includes a Name field 382 that is designed to present a string value stored in the Name field 254 of the CI_DBMS table 252A, a Version field 384 that is designed to present a string value stored in the Version field 268 of the CI_DBMS table 252C, a Source DB field 386 that is designed to present a string value stored in the Source_Database field 270 of the CI_DBMS table 252C, a Replicats Count field 388 that is designed to present an integer value stored in the Replication_Process_Count field 262 of the CI_DBMS table 252C, an Extracts Count field 390 that is designed to present an integer value stored in the Extraction_Process_Count field 260 of the CI_DBMS table 252C, a Configuration file field 392 that is designed to present a string value stored in the Configuration_File_Path field 258 of the CI_DBMS table 252C, a Report File field 394 that is designed to present a string value stored in the Report_File_Path field 264 of the CI_DBMS table 252C, a Type field 396 that is designed to present a string value stored in the Type field 266 of the CI_DBMS table 252C, and an Installation directory field 398 that is designed to present a string value stored in the Install_Directory field 256 of the CI_DBMS table 252C. The illustrated portion of the UI 234 also includes a Description field 400 that is designed to present a string value stored in a Description field of the CI_DBMS table 252C, wherein this field may be defined by the extension of the CI_Application class 252B, as discussed above with respect to FIG. 5. In addition to presenting these values from the CI_DBMS table 252C, in certain embodiments, the various fields the UI 234 are further designed to receive user inputs to modify the underlying data stored in the CI_DBMS table 252C of the CMDB 232.

Figure 11:
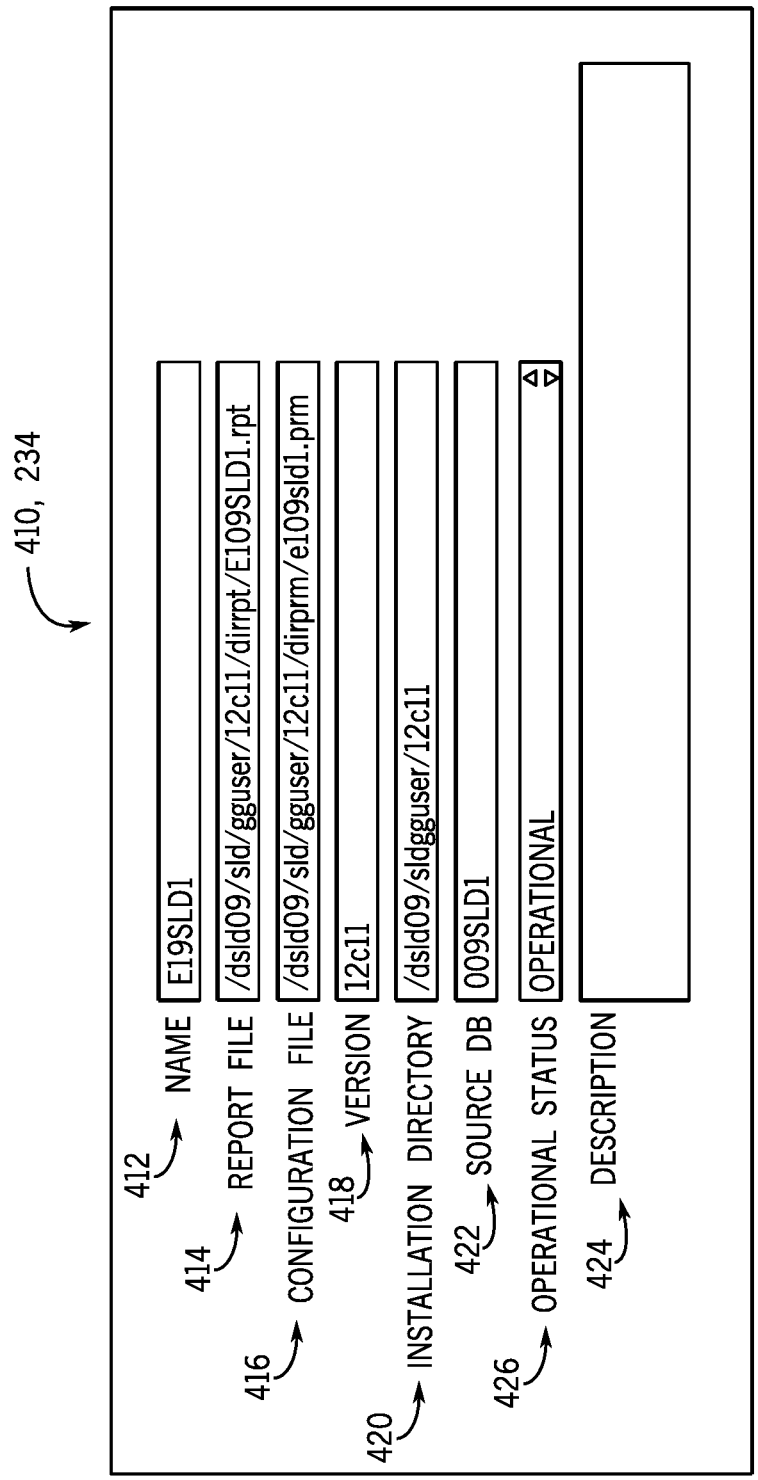
FIG. 11 is a simulated screen-shot of a portion of the UI that is designed to present CI data from the CI_DBMS_Extraction table of the CMDB for an extraction process of the DBMS, in accordance with aspects of the present disclosure.

FIG. 11 is a simulated screen-shot 410 of a portion of the UI 234 that is designed to present CI data from the CI_DBMS_Extraction table 252D of the CMDB 232 for the one or more extraction processes 224 of the DBMS 220, in accordance with embodiments of the present technique. The illustrated portion of the UI 234 includes a Name field 412 that is designed to present a string value stored in the Name field 272 of the CI_DBMS_Extraction table 252D, a Report File field 414 that is designed to present a string value stored in the Report_File_Path field 276 of the CI_DBMS_Extraction table 252D, a Configuration file field 416 that is designed to present a string value stored in the Configuration_File_Path field 282 of the CI_DBMS_Extraction table 252D, a Version field 418 that is designed to present a string value stored in the Version field 278 of the CI_DBMS_Extraction table 252D, an Installation directory field 420 that is designed to present a string value stored in the Install_Directory field 274 of the CI_DBMS_Extraction table 252D, and a Source DB field 422 that is designed to present a string value stored in the Source_Database field 280 of the CI_DBMS_Extraction table 252D. The illustrated portion of the UI 234 also includes a Description field 424 that is designed to present a string value stored in a Description field of the CI_DBMS_Extraction table 252D, and includes an Operational status field 426 that is designed to present a string value associated with an enumerated Operational_Status field of the CI_DBMS_Extraction table 252D, wherein these fields may be defined by the extension of the CI Applications class 252D, as discussed above with respect to FIG. 5. For example, the Operational_Status field of the CI_DBMS_Extraction table 252D inherited from the CI_Applications class 252B may store an integer value in which a first value (e.g., zero) represents a non-operational state, a second value (e.g., one) represents a non-operational state, and so forth, wherein each of these values are associated with a string describing these states in the drop-down box of the illustrated Operational status field 426 in FIG. 11. In addition to presenting these values from the CI_DBMS_Extraction table 252D, in certain embodiments, the various fields the UI 234 are further designed to receive user inputs to modify the underlying data stored in the CI_DBMS_Extraction table 252D of the CMDB 232.

Figure 12:
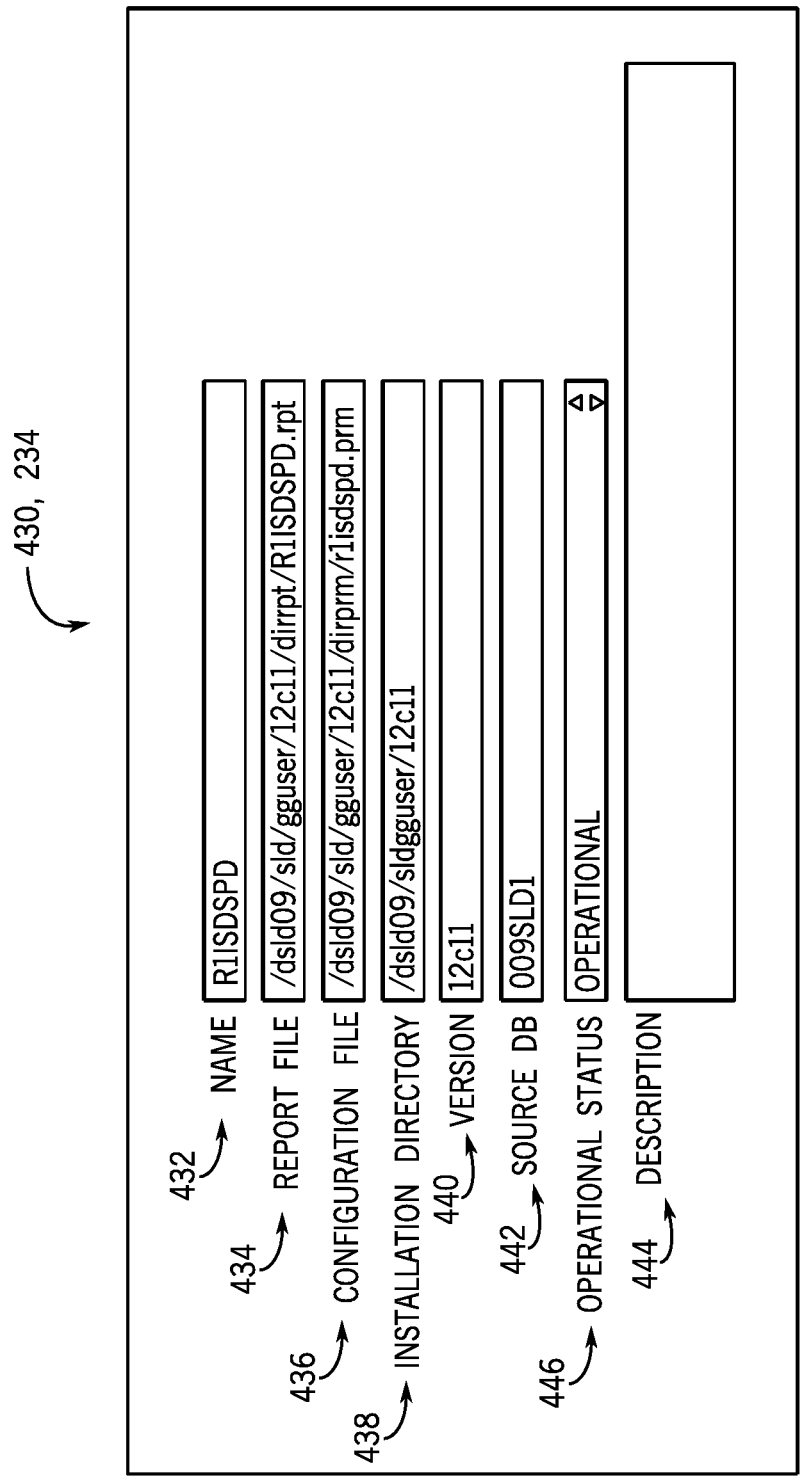
FIG. 12 is a simulated screen-shot of a portion of the UI that is designed to present CI data from the CI_DBMS_Replication table of the CMDB for a replication process of the DBMS, in accordance with aspects of the present disclosure.

FIG. 12 is a simulated screen-shot 430 of a portion of the UI 234 that is designed to present CI data from the CI_DBMS_Replication table 252E of the CMDB 232 for the one or more replication processes 226 of the DBMS 220, in accordance with embodiments of the present technique. The illustrated portion of the UI 234 includes a Name field 432 that is designed to present a string value stored in the Name field 284 of the CI_DBMS_Replication table 252E, a Report File field 434 that is designed to present a string value stored in the Report_File_Path field 288 of the CI_DBMS_Replication table 252E, a Configuration file field 436 that is designed to present a string value stored in the Configuration_File_Path field 294 of the CI_DBMS_Replication table 252E, an Installation directory field 438 that is designed to present a string value stored in the Install_Directory field 286 of the CI_DBMS_Replication table 252E, a Version field 440 that is designed to present a string value stored in the Version field 290 of the CI_DBMS_Replication table 252E, and a Source DB field 442 that is designed to present a string value stored in the Source_Database field 292 of the CI_DBMS_Replication table 252E. The illustrated portion of the UI 234 also includes a Description field 444 that is designed to present a string value stored in a Description field of the CI_DBMS_Replication table 252E, and includes an Operational status field 446 that is designed to present a string value associated with an enumerated Operational Status field of the CI DBMS Replication table 252E, wherein these fields may be defined by the extension of the CI_Applications class 252B, as discussed above with respect to FIG. 5. For example, the Operational Status field of the CI_DBMS_Replication table 252E inherited from the CI_Applications class 252B may store an integer value in which a first value (e.g., zero) represents a non-operational state, a second value (e.g., one) represents a non-operational state, and so forth, wherein each of these values are associated with a string describing these states in the drop-down box of the illustrated Operational status field 446. In addition to presenting these values from the CI_DBMS_Replication table 252E, in certain embodiments, the various fields the UI 234 are further designed to receive user inputs to modify the underlying data stored in the CI_DBMS_Replication table 252E of the CMDB 232.

Figure 13:
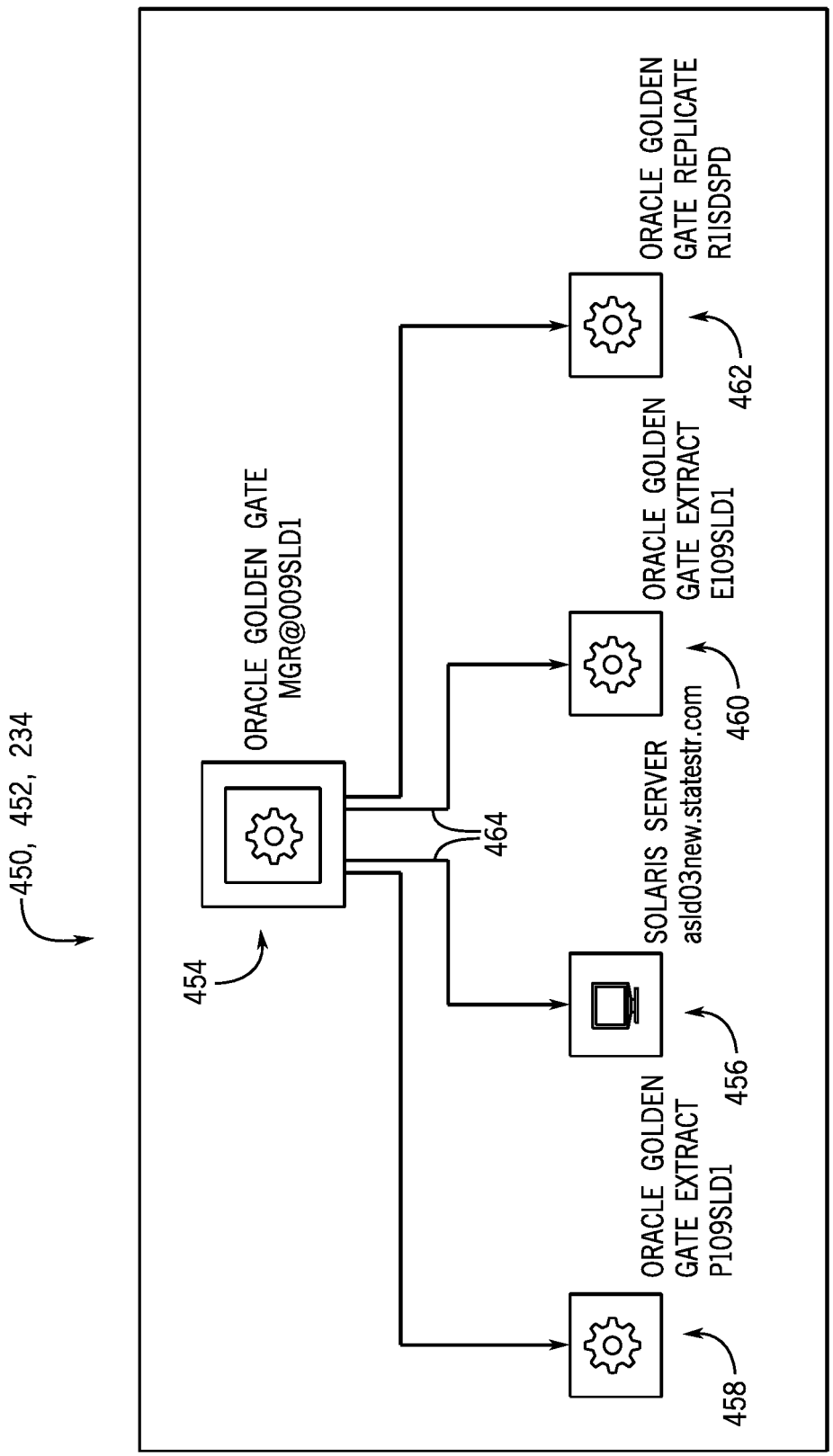
FIG. 13 is a simulated screen-shot of a portion of the UI that includes a diagram that visually presents a portion of the DBMS CI data discovered by the discovery server on the client network, in accordance with aspects of the present disclosure.

FIG. 13 is a simulated screen-shot 450 of a portion of the UI 234 that includes a diagram 452 designed to visually present DBMS CI data discovered by the discovery server 227 on the client network 12, in accordance with an embodiment of the present approach. More specifically, the illustrated portion of the UI 234 is a diagram illustrating relationships between CI data stored in the CI_DBMS table 252C, the CI_DBMS_Extraction table 252D, and CI_DBMS_Replication table 252E. As such, the illustrated portion of the UI 234 includes a first icon 454 with a Name field 254 value of "MGR@O09SLD1", which represents the management process 222 of the DBMS 220. As illustrated, this first icon 454 is associated with other icons (e.g., a second icon 456, a third icon 458, a fourth icon 460, and a fifth icon 462) via arrows 464 that indicate relationships within the CI data. For example, the second icon 465 of the illustrated UI 234 represents the entry on the CI_Hardware table 252A (e.g., a SOLARIS server) that hosts the management process 222, the extraction processes 224, and the replication processes 226 of the DBMS 220. The third icon 458 of the illustrated UI 234 represents a first extraction process of the DBMS 220 having a value for the Name field 272 of "P109SLD1". A fourth icon 460 represents a second extraction process of the DBMS 220 having a value for the Name field 272 of "E109SLD1". Furthermore, the UI 234 includes a fifth icon 462 that represents a replication process of the DBMS 220 having a value of the Name field 284 of "R1ISDSPD".

As such, it may be appreciated that the portion of the UI 234 illustrated in FIG. 13 provides a succinct view of relationships between the DBMS CI data to enable a user to quickly verify the structure of the DBMS 220 on the client network 12. Additionally, in certain embodiments, each of the icons 454, 456, 458, 460, and 462 may be designed to receive a user input (e.g., a selection via a mouse click) and, in response, another portion of the UI 234 is presented. For example, when the first icon 454 receives user input, then the user may be presented with the portion of the UI 234 illustrated in FIG. 10 populated with CI data for the selected management process 222. When the third icon 458 or the fourth icon 460 receives user input, then the user may be presented with the portion of the UI 234 illustrated in FIG. 11 populated with CI data for the selected extraction process of the DBMS 220. When the fifth icon 462 receives user input, then the user may be presented with the portion of the UI 234 illustrated in FIG. 12 populated with CI data for the selected replication process of the DBMS 220.

Accordingly, the disclosed discovery process enables the collection and transfer of DBMS CI data into the CMDB 232 for presentation and/or modification using portions of the UI 234, as illustrated in FIGS. 10-13 discussed above. However, it may also be appreciated that importing the DBMS CI data into the CMDB 232 also enables additional features and advantages. For example, once the discovered CI data regarding the DBMS 220 is imported into the CMDB 232, incidents and change requests to be opened for the CIs that correspond to the DBMS 220. Additionally, the discovered CI data regarding the DBMS 220 can be compared to software licensing data (e.g., stored by the database 104) to determine whether the client has a sufficient software licenses (e.g., in number and/or type) to operate the DBMS 220 in compliance.

The technical effects of the disclosed technique include to enabling discovery of database management system (DBMS) hosted by one or more client devices on a client network. This discovery process is designed to be performed without being granted special or additional privileges within the DBMS itself. The collected DBMS CI data is transmitted to the client instance and stored as in a number of CI tables of a configuration management database (CMDB). This stored DBMS CI data can subsequently be accessed using user interfaces (UIs) associated within the client instance. For example, a IU of the client instance may access the stored DBMS CI data to graphically present relationships between the processes of the DBMS on the client network, to enable incidents and change requests to be opened for the CIs that correspond to the DBMS, and/or to evaluate license compliance with respect to hosting the DBMS on the client network.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A discovery server, comprising:
    at least one memory configured to store a data structure;
    at least one processor configured to execute stored instructions to perform actions, comprising:
        receiving discovery process parameters from a client instance;
        applying a discovery pattern to a client device hosting a database management system (DBMS) on a client network to populate the data structure with configuration item (CI) data for a management process of the DBMS, one or more extraction processes of the DBMS, and one or more replication processes of the DBMS, wherein applying the discovery pattern comprises parsing files in a configuration directory of the management process, a report directory of the management process, or a combination thereof, to determine a respective name of each of the one or more extraction processes and each of the one or more replication processes; and
        transmitting the populated data structure to the client instance for storage in a configuration management database (CMDB) of the client instance.

2. The discovery server of claim 1, wherein, to apply the discovery pattern, the at least one processor is configured to execute stored instructions to perform actions, comprising:
    opening a connection to the client device on the client network that hosts the management process of the DBMS based on the received discovery process parameters.

3. The discovery server of claim 1, wherein, to apply the discovery pattern, the at least one processor is configured to execute stored instructions to perform actions, comprising:
    determining the configuration directory and the report directory of the management process of the DBMS.

4. The discovery server of claim 1, wherein, to apply the discovery pattern, the at least one processor is configured to execute stored instructions to perform actions, comprising:
    determining a respective configuration file path and a respective report file path for each of the one or more extraction processes and each of the one or more replication processes of the DBMS.

5. The discovery server of claim 1, wherein the data structure comprises a first table configured to store the CI data for the management process of the CMDB, a second table configured to store the CI data for the one or more extraction processes of the CMDB, and a third table configured to store CI data for the one or more replication processes, wherein the second table and the third table are configured to be managed by the first table.

6. The discovery server of claim 1, wherein the client instance is associated with a user interface (UI), wherein the UI is configured to present the CI data stored in the CMDB for the DBMS, wherein the UI comprises a diagram that visually depicts relationships between the CI data stored in the CMDB for the DBMS, and wherein the UI comprises at least one form configured to receive the discovery process parameters from a user of the client instance.

7. The discovery server of claim 1, wherein, to parse the files, the at least one processor is configured to execute stored instructions to perform actions, comprising:
    parsing configuration files in the configuration directory of the management process and report files in the report directory of the management process to determine the respective name of each of the one or more extraction processes and each of the one or more replication processes of the DBMS.

8. The discovery server of claim 1, wherein, to apply the discovery pattern, the at least one processor is configured to execute stored instructions to perform actions, comprising:
    determining an extraction processes count and a replication process count for the management process of the DBMS based on the respective name of each of the one or more extraction processes and each of the one or more replication processes of the DBMS.

9. A method of performing a discovery process of a database management system (DBMS) operating on a client network using a discovery server operating on the client network, comprising:
    opening a connection from the discovery server to a client device of the client network that hosts a management process of the DBMS;
    determining a name, an install directory, a configuration file path, and a report file path of the management process;
    determining a configuration directory and a report directory of the management process from the configuration file path and the report file path, respectively;
    identifying and parsing configuration files in the configuration directory of the management process and report files in the report directory of the management process;
    determining a respective name of each extraction process and each replication process of the DBMS from the parsed configuration files, the parsed report files, or a combination thereof;
    determining a respective configuration file path and a respective report file path for each extraction process of the DBMS and for each replication process of the DBMS; and
    determining an extraction processes count and a replication process count for the management process of the DBMS.

10. The method of claim 9, comprising:
    receiving discovery process parameters from a client instance before opening the connection from the discovery server to the client device, wherein opening the connection comprises using one or more discovery process parameters to open the connection from the discovery server to the client device.

11. The method of claim 9, wherein determining the name, the install directory, the configuration file path, and the report file path of the management process comprises:
    requesting and receiving the name, the install directory, the configuration file path, and the report file path from the management process of the DBMS.

12. The method of claim 9, wherein identifying and parsing the configuration files in the configuration directory and the report files in the report directory comprises:
    requesting and receiving a first sorted list of the configuration files in the configuration directory from an operating system (OS) of a client device hosting the management process of the DBMS; and
    requesting and receiving a second sorted list of the report files in the report directory from the OS of the client device hosting the management process of the DBMS.

13. The method of claim 9, wherein determining the configuration directory and the report directory of the management process comprises:
   truncating the configuration file path to determine the configuration directory of the management process; and
   truncating the report file path to determine the report directory of the management process.

14. The method of claim 9, wherein determining the respective configuration file path and the respective report file path comprises:
   requesting and receiving the respective configuration file path and the respective report file path from the management process of the DBMS for each extraction process and each replication process of the DBMS.

15. The method of claim 9, comprising:
   storing the name, the install directory, the configuration file path, the report file path, the extraction processes count, and the replication process count of the management process in a first table in a memory of the discovery server;
   storing the respective name, the respective configuration file path, and the respective report file path of each extraction process of the DBMS in a second table in the memory of the discovery server; and
   storing the respective name, the respective configuration file path, and the respective report file path of each replication process of the DBMS in a third table in a memory of the discovery server.

16. The method of claim 15, comprising removing duplicate records from the second table based on the respective name of each extraction process and removing duplicate records from the third table based on the respective name of each replication process.

17. The method of claim 16, wherein determining the extraction processes count and the replication process count comprises:
   after removing the duplicate records from the second table, determining the extraction processes count to be a number of extraction process records stored in the second table that are related to the management process of the DBMS; and
   after removing the duplicate records from the third table, determining the replication processes count to be a number of replication process records stored in the third table that are related to the management process of the DBMS.

18. The method of claim 15, comprising:
   transmitting the first table, the second table, and the third table to a client instance for storage in a configuration management database (CMDB) of the client instance.

19. A non-transitory, computer-readable medium storing instructions executable by a processor of a discovery server of a client network to perform a discovery process of a database management system (DBMS) of the client network, the instructions comprising instructions to:
   request and receive, from a management process of the DBMS, a name, an install directory, a configuration file path, and a report file path of the management process;
   parse configuration files of the management process, report files of the management process, or a combination thereof, to determine a respective name of each extraction process and each replication process of the DBMS;
   determine an extraction processes count and a replication process count for the DBMS based on the respective name of each extraction process and each replication process of the DBMS;
   request and receive a respective configuration file path and a respective report file path for each extraction process and each replication process of the DBMS from the management process of the DBMS;
   store the name, the install directory, the configuration file path, the report file path, the extraction processes count, and the replication process count of the management process in a first table of a data structure;
   store the respective name, the respective configuration file path, and the respective report file path of each extraction process of the DBMS in a second table of the data structure;
   store the respective name, the respective configuration file path, and the respective report file path of each replication process of the DBMS in a third table of the data structure; and
   transmit the data structure to a client instance for storage in a configuration management database (CMDB) of the client instance.

20. The medium of claim 19, wherein the instruction comprise instructions to:
   receive discovery process parameters from a client instance; and
   open a connection from the discovery server to a client device of the client network that hosts a management process of the DBMS based on the received discovery process parameters, wherein the received discovery process parameters comprise a username and password.

* * * * *